(12) United States Patent
Clediere

(10) Patent No.: US 11,405,477 B1
(45) Date of Patent: Aug. 2, 2022

(54) SYSTEMS AND METHODS FOR PROVIDING UPDATES IN SOCIAL NETWORKING SYSTEMS

(71) Applicant: Meta Platforms, Inc., Menlo Park, CA (US)

(72) Inventor: Robin Maxime Clediere, Lynnwood, WA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 16/508,091

(22) Filed: Jul. 10, 2019

(51) Int. Cl.
| H04L 29/08 | (2006.01) |
| H04L 67/55 | (2022.01) |
| H04L 51/52 | (2022.01) |

(52) U.S. Cl.
CPC .............. H04L 67/26 (2013.01); H04L 51/32 (2013.01)

(58) Field of Classification Search
CPC ......... H04L 67/26; H04L 51/32; H04L 51/24; H04L 67/306; H04L 67/22; H04L 12/1895; H04L 51/10; G06Q 50/01
USPC ......................................................... 709/206
See application file for complete search history.

(56) References Cited

U.S. PATENT DOCUMENTS

| 2011/0004831 A1* | 1/2011 | Steinberg ............ G06F 3/04842 715/753 |
| 2011/0321003 A1* | 12/2011 | Doig ..................... G06F 16/904 717/107 |
| 2013/0061156 A1* | 3/2013 | Olsen ..................... G06Q 50/01 715/753 |
| 2014/0207860 A1* | 7/2014 | Wang ..................... G06Q 10/10 709/204 |
| 2014/0282016 A1* | 9/2014 | Hosier, Jr. .............. G06Q 50/01 715/733 |
| 2014/0282084 A1* | 9/2014 | Murarka .................. H04L 51/32 715/752 |
| 2015/0135225 A1* | 5/2015 | Bayer ................. H04N 21/4668 725/46 |
| 2016/0070764 A1* | 3/2016 | Helvik .............. G06F 16/24578 707/734 |
| 2016/0165002 A1* | 6/2016 | LeBeau .................. H04L 67/141 709/204 |
| 2017/0054614 A1* | 2/2017 | Carter .................... H04L 47/805 |
| 2017/0118303 A1* | 4/2017 | Ratiu ................. G06Q 30/0244 |
| 2017/0185254 A1* | 6/2017 | Zeng ...................... G06F 3/0482 |
| 2017/0187668 A1* | 6/2017 | Elliott ..................... H04L 51/14 |
| 2018/0082384 A1* | 3/2018 | Karroum ............... H04L 67/306 |
| 2019/0026786 A1* | 1/2019 | Khoury ............. G06Q 30/0277 |
| 2019/0129967 A1* | 5/2019 | Lemp ...................... H04L 51/32 |
| 2019/0235936 A1* | 8/2019 | Murdock ................ G06F 9/542 |
| 2020/0012727 A1* | 1/2020 | Lewis ............... G06F 16/24578 |

* cited by examiner

*Primary Examiner* — John B Walsh
(74) *Attorney, Agent, or Firm* — Sheppard Mullin Richter & Hampton LLP

(57) ABSTRACT

Systems, methods, and non-transitory computer-readable media can acquire content items in a content sharing system from a time a user last accessed the content sharing system. The content items can be ranked based on relevance of the content items. An update including at least one content item selected from the content items for access by the user can be generated.

20 Claims, 8 Drawing Sheets

SYSTEMS AND METHODS FOR PROVIDING UPDATES IN SOCIAL NETWORKING SYSTEMS

FIELD OF THE INVENTION

The present technology relates to the field of social networking systems. More particularly, the present technology relates to computerized techniques for providing electronic updates in a social networking system.

BACKGROUND

Today, people often utilize computing devices (or systems) for a wide variety of purposes. Users can use their computing devices to, for example, interact with one another, access content, share content, and create content. In some cases, content items can include postings from users participating in a social networking system. These postings may include text and media content items, such as images, graphical interchange formats (GIFs), video, and audio. These postings may be published to the social networking system for consumption by others.

SUMMARY

Various embodiments of the present technology can include systems, methods, and non-transitory computer readable media configured to acquire content items in a content sharing system from a time a user last accessed the content sharing system. The content items can be ranked based on relevance of the content items. An update including at least one content item selected from the content items for access by the user can be generated.

In some embodiments, a notification, based on a routine of the user, can be provided to the user through a content feed. The notification can indicate to the user that the update is available. The update can be provided to the user upon user selection of the notification.

In some embodiments, the routine of the user can be determined based on a time in a time period within which a probability of the user accessing the content sharing system satisfies a threshold.

In some embodiments, the content items can be aggregated from the time the user last accessed the content sharing system to a time the user is currently accessing the content sharing system. The relevance of the content items can be determined based on at least in part on social importance of the content items.

In some embodiments, the social importance of the content items can include at least one of a number of comments the content items receive in the content sharing system, a number of reactions the content items receive in the content sharing system, and a number of shares the content items receive in the content sharing system.

In some embodiments, the number of reactions the content items receive in the content sharing system can include at least one of likes, loves, or wows.

In some embodiments, the relevance of the content items can be determined based on recency of the content items. The recency of the content items can be determined based on time stamps of the content items.

In some embodiments, the relevance of the content items can be further determined based on types of content items. The types of content items can include at least one of images, video, text, or life events.

In some embodiments, the update can include a messaging interface allowing the user to interact with the content items.

In some embodiments, the update can display location related information based on location data of the user.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

Figure 1:
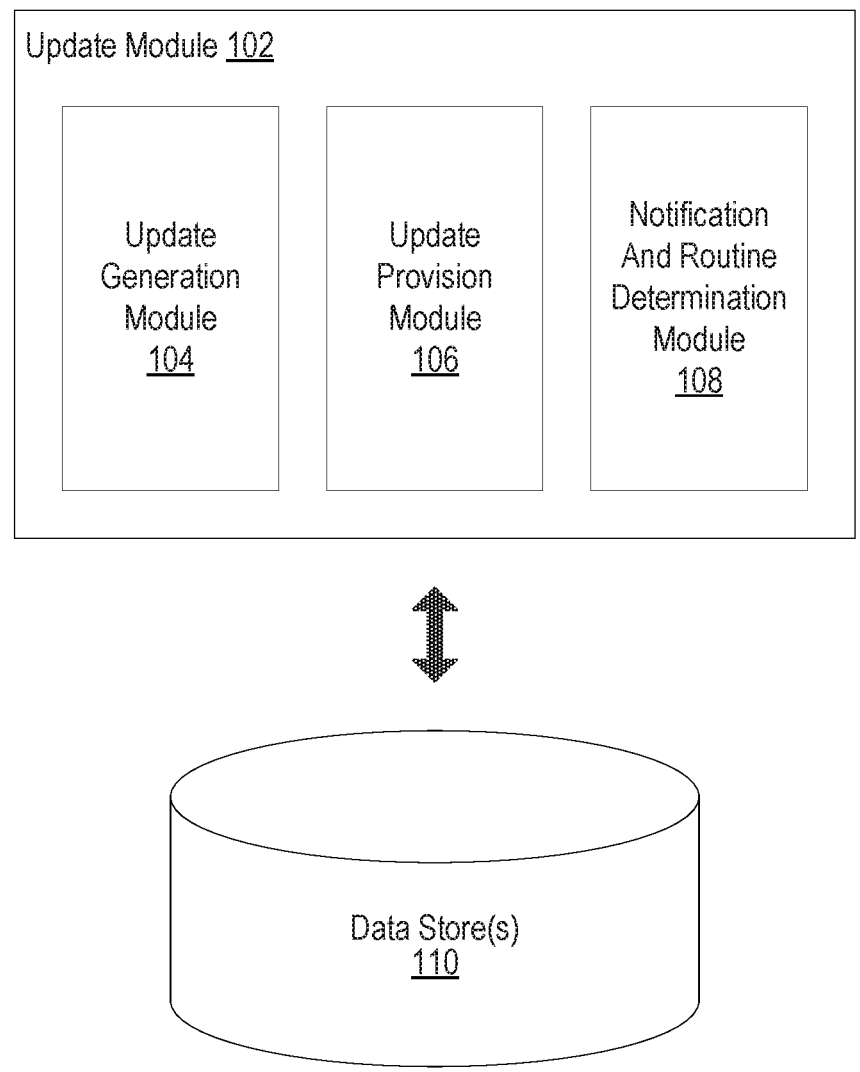
FIG. 1 illustrates an example system, including an example update module, according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Providing Updates in Social Networking Systems

People often utilize computing devices (or systems) for a wide variety of purposes. Users can use their computing devices to, for example, interact with one another, access content, share content, and create content. In some cases, content items can include postings from users participating in a social networking system. These postings may include text and media content items, such as images, graphical interchange formats (GIFs), videos, and audio. These postings may be published to the social networking system for consumption by others.

A social networking system can provide users with access to various content items. For example, the social networking system can provide users with access to content items through their content feeds. These content items may include text, pictures, video, audio, and/or other user generated content items. For example, a content item can include one or more photos taken by a user and can be made accessible to other users (e.g., friends of the user) through their content feeds. In some cases, users can interact with content items in content feeds. For example, users may comment on, react to (e.g., "like," "wow," "sad," "cry," "angry"), or share content items. In general, content items can be constantly generated and posted to the social networking system around the clock. For example, while a user is not accessing content from the social networking system (e.g., the user is away from the social networking system), other users may continue to post content items to the social networking system. In this example, when the user accesses content from the social networking system at a later time, the user may be presented through his or her content feed with recently posted content items by the other users. To get up-to-date and be fully updated (caught up) regarding the content items posted while the user was away, the user may need to scroll through countless content items in the user's content feed. The large number of such content items can be a significant burden on the user. In addition, the user will find it challenging to become up-to-date about events involving social connections that transpired during the user's prolonged absence from the social networking system. This problem may be exacerbated if the user has a large number of social connections in the social networking system. Accordingly, conventional approaches to organize and present content items to users in their content feeds may not be helpful or efficient when a user sporadically accesses content from the social networking system or does not access content therefrom for prolonged periods of time. Accordingly, conventional approaches may not be effective in addressing these and other problems arising in computer technology.

An improved approach rooted in computer technology overcomes the foregoing and other disadvantages associated with conventional approaches specifically arising in the realm of computer technology. The present technology can generate for a user an update (a summary) of events that occurred in a social networking system from a time the user last accessed content from the social networking system. The update can be generated based on content items posted to the social networking system. These content items can be ranked based on their relevance to the user. Relevance of a content item to a user can be determined based on, for example, social importance (e.g., comments, reactions, shares, etc.) of the content item to the user, recency of the content item, type of the content item, or user preference. For example, the more reactions (e.g., likes) a content item receives from users of a social networking system, the more potentially socially important the content item becomes and the more relevant the content item is to a user accessing the social networking system. As another example, the more recent a content item is posted to the social networking system, the more potentially relevant the content item is to the user. The update is generated to include certain content items that are relevant to the user. Once the update is generated, the update can be provided to the user through a content feed of the user. The update also allows the user to interact with (e.g., comment on, react to, share) content items provided in the update. In some cases, a notification associated with the update can be sent to the user based on the user's routine in accessing the social networking system. For example, if a user tends to access content from a social networking system in the morning, a notification corresponding to an update can appear in the user's content feed when the user accesses content from the social networking system in the morning. More details describing the present technology are provided below.

FIG. 1 illustrates an example system 100, including an example update module 102, according to an embodiment of the present technology. In some embodiments, the update module 102 can be implemented as part of a content sharing system, such as a social networking system. As shown in the example of FIG. 1, the update module 102 can include an update generation module 104, an update provision module 106, and a notification and routine determination module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the update module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the update module 102 or at least a portion thereof can be implemented using one or more computing devices or systems that include one or more servers, such as network servers or cloud servers. In some instances, the update module 102 can, in part or in whole, be implemented within or configured to operate in conjunction with a social networking system (or service), such as the social networking system 630 of FIG. 6. In some instances, the update module 102 can be, in part or in whole, implemented within or configured to operate in conjunction or be integrated with a client computing device, such as the user device 610 of FIG. 6. The update module 102 can be implemented as or within a dedicated application (e.g., app), a program, or an applet running on a user computing device or client computing system. The application incorporating or implementing instructions for performing some, or all, functionality of the update module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

In some embodiments, the update module 102 can be configured to communicate and/or operate with the at least one data store 110, as shown in the example system 100. The at least one data store 110 can be configured to store and maintain various types of data. For example, the at least one data store 110 can store information describing various content that has been viewed, accessed, consumed, modified, or created by user or third party entities of the social networking system. In some implementations, the at least one data store 110 can store information associated with the social networking system (e.g., the social networking system 630 of FIG. 6). The information associated with the social networking system can include data about users, third party entities, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users or third party entities, such as user or third party entity identifiers, user or third party entity information, profile information, user or third party entity specified settings, content produced or posted by users or third party entities, and various other types of user or third party entity data.

The update generation module 104 can generate for a user an update of content items associated with events that occurred in a content sharing system, such as a social networking system. In some embodiments, an update can be an interface or surface that is separate from a content feed of the social networking system. The update can present the user with a summary of the most relevant or important content items and associated events that occurred in the social networking system while the user was away from the social networking system or since the user last accessed content from the social networking system. Instead of arduously scrolling through countless content items to get updated on the most relevant or important content items or related events that occurred while the user was away, the update can allow the user to access content items displayed in the update to quickly be informed about the events. In various embodiments, the update can be generated based on content items posted to the social networking system by other users. These content items can be acquired between time periods. For example, content items posted by users of a social networking system can be acquired by the update generation module 104 from a first time that a user last accessed content from the social networking system to a second time that the user is currently accessing content from the social networking system. Once the content items are acquired, the content items can be aggregated and ranked based on their relevance to the user. Relevance of a content item to a user can be determined based at least in part on, for example, social importance of the content item, recency of the content item, type of the content item, or user preference. In general, content items that are determined to have a threshold level of relevance to a user are provided to the user in an update. More details regarding the update generation module 104 will be provided with reference to FIG. 2.

The update provision module 106 can provide an update generated by the update generation module 104 to a user of a content sharing system, such as a social networking system. An update can be provided to a user through a content feed while the user browses content from the social networking system. Content items displayed in the update are content items determined by the update generation module 104 to be the most relevant or important content items to the user that the user was not able to access while the user was away from the social networking system. In some embodiments, the update provision module 106 can display content items relating to major events of a day, such as birthdays or events scheduled through the social networking system (e.g., social gatherings, etc.), to the user through the update. For example, assume a friend of a user posted photos of an event to a social networking system after the user last accessed content from the social networking system. In this example, when the user accesses content from the social networking system at a later time, the user may be presented with an update through which the user may access the photos of the event. As another example, since the user last accessed content from the social networking system, assume another friend of the user moved from one city to another city and the other friend changed her profile in the social networking system to reflect the move. In this example, the change to the profile can correspond to a life event, and can be displayed in an update. In some embodiments, the update provision module 106 can display location related information based on location data of the user. For example, in addition to displaying content items that a user was not able to access during the user's absence from the social networking system, the update provision module 106 may display weather information or other location related information (e.g., local sports scores, etc.) in an update based on location data of the user. For example, location data of the user can be determined based on location information entered by a user, a check in performed by the user, or GPS data determined by a computing device associated with the user. In some embodiments, the update provision module 106 can provide a list of other users who, like the user, are concurrently accessing content from the social networking system and can allow the user to directly communicate (e.g., messaging) with the other users. In some embodiments, the user can interact with content items displayed in an update. For example, a user can comment on, react to (e.g., like, love, wow, etc.), or share a content item displayed in an update. In some embodiments, the update provision module 106 may further display a graphical element that, when selected, returns the user from an update to the user's content feed.

The notification and routine determination module 108 can provide to a user a notification that an update is available when the user is most likely to access the social networking system. For example, a notification can be provided to a user through the user's content feed while the user accesses content from the social networking system. In some embodiments, the notification can be provided to a user when it is routine for the user to access content from the social networking system at a particular time, a particular day, or a particular time in a day, etc. Many variations are possible.

The notification and routine determination module 108 can determine a routine of a user by tracking time periods the user accesses content from a social networking system. For example, based on social networking system usage data of a user collected over a period of time, the notification and routine determination module 108 can determine at a threshold level of confidence that the user typically accesses content at a particular time, which constitutes a routine of the user on the social networking system. Based on this information, a notification that an update is available can be provided to the user when the user accesses content from the social networking system in accordance with the routine at the particular time. For example, assume a first user generally accesses content from a social networking system when the first user wakes up in the morning. In this example, a probability that the first user will access content from the social networking system in mornings is high and may satisfy a probability threshold. Therefore, in this example, a routine of the first user corresponds to daily mornings. In this example, the time is morning and the time period is daily. In some embodiments, the notification is not provided to the user when the user accesses content from the social networking system at other times (i.e., not during the routine). In some embodiments, the notification and routine determination module 108 can use various machine learning techniques to determine the routine of the user. For example, a machine learning model can be trained with a training data set comprising social network usage data of users and various other data. Once trained, the machine learning model can be utilized to determine a routine of a user. Many implementations are possible.

Figure 2:
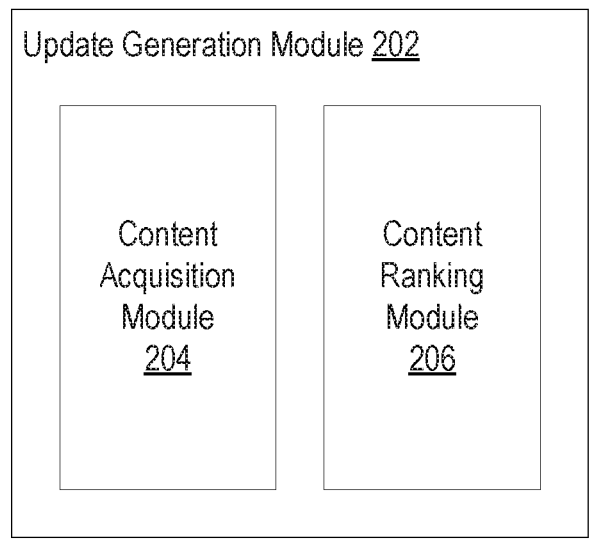
FIG. 2 illustrates an example update generation module, according to an embodiment of the present technology.

FIG. 2 illustrates an example update generation module 202, according to an embodiment of the present technology. In some embodiments, the update generation module 104 of FIG. 1 can be implemented as the update generation module 202. As discussed, the update generation module 202 can generate for a user an update of content items associated with events that occurred in a content sharing system, such as a social networking system. As shown in FIG. 2, the update generation module 202 can include a content acquisition module 204 and a content ranking module 206.

The content acquisition module 204 can acquire content items posted by users of a content sharing system, such as a social networking system. In some embodiments, content items can be acquired between two suitable time periods. For example, content items posted to a social networking system between two successive user logins (or two instances of access to the social networking system or an app associated with the social networking system) can be acquired by the content acquisition module 204. For instance, content items posted by users to the social networking system can be acquired from a time a user last logged into the social networking system to a time the user is currently logged into the social networking system. In some embodiments, the content acquisition module 204 can acquire or select content items from users who are connected to a user in the social networking system. For example, in some embodiments, only content items posted by friends, family, or other social acquaintances of the user are acquired by the content acquisition module 204. For instance, the content acquisition module 204 can select content items of certain connections of the user who are within a threshold level of connection proximity to the user. In some embodiments, the content acquisition module 204 can acquire content items that are of certain types. For example, in some embodiments, only photos, videos, content relating to social events (e.g., birthdays), and/or content relating to life events posted by users who are connected to the user are acquired. Many variations are possible.

The content ranking module 206 can aggregate content items and determine relevance of the content items. The content ranking module 206 can aggregate the content items acquired by the content acquisition module 204. The content ranking module 206 can then determine relevance of the aggregated content items. In some embodiments, content ranking module 206 can determine relevance of a content item based on social importance of the content item. Social importance of a content item can be determined based on a number of comments, a number of reactions (e.g., likes, loves, wows, etc.), and/or a number of shares that the content item receives in a content sharing system, such as a social working system. For example, a first content item can have more comments associated with it than a second content item. In this example, the first content item can be determined by the content ranking module 206 to be more socially important, and thus more relevant to a user. As another example, a first content item can receive a smaller number of likes from users than a second content item. In this example, the content ranking module 206 may determine the second content item to be more socially important, and thus more relevant to a user. As yet another example, a first content item that has been shared more often than a second content item may be determined to be more socially important than the second content item, and thus more relevant to a user. In some embodiments, the content ranking module 206 can determine relevance of a content item based on its recency. Recency can be determined based on time stamp of content items. For example, the more recent a content item is posted to a social networking system in relation to a time when a user is accessing the social networking system after an absence, the more potentially relevant the content item is to a user. In some embodiments, the content ranking module 206 can determine relevance of a content item based on a type of the content item. Types of content items can include, for example, images, videos, text, content referencing life events, etc. As a type of content item, content referencing a life event can include, for example, a change in marital status, a birth of a person, a passing of a person, a residential move from one location to another location, etc. Content items relating to life events may be more relevant to a user than other types of content items. For instance, a content item relating to change in marital status of a connection may be more important to the user than a video about an event that took place two days ago. In some embodiments, the content ranking module 206 can determine relevance of a content item based on user preferences. In this regard, a user may prefer certain types of content items over other types of content items. For example, assume a user generally prefers content items containing photos over content items containing text. In this example, content items that contain photos can be determined to be more relevant to the user. In some embodiments, the content ranking module 206 can generate values of relevance. For example, each content item can be assigned a quantitative value reflecting a relevance value of the content item to a user. Many variations are possible.

In some embodiments, the content ranking module 206 can rank content items based on their relevance. The content ranking module 206 can rank the content items acquired by the content acquisition module 204 based on their determined relevance or relevance values. In general, content items that are more relevant to a user are ranked higher than other content items. For example, assume a user prefers content items including photos over content items including video. Therefore, in this example, photos are ranked higher than video for inclusion in an update. As another example, content items relating to life events can be ranked higher than other types of content items. Many variations are possible. Content items that have relevance values that satisfy a threshold value or reflect a threshold number of highest ranking content items can be selected for inclusion in an update.

Figure 3:
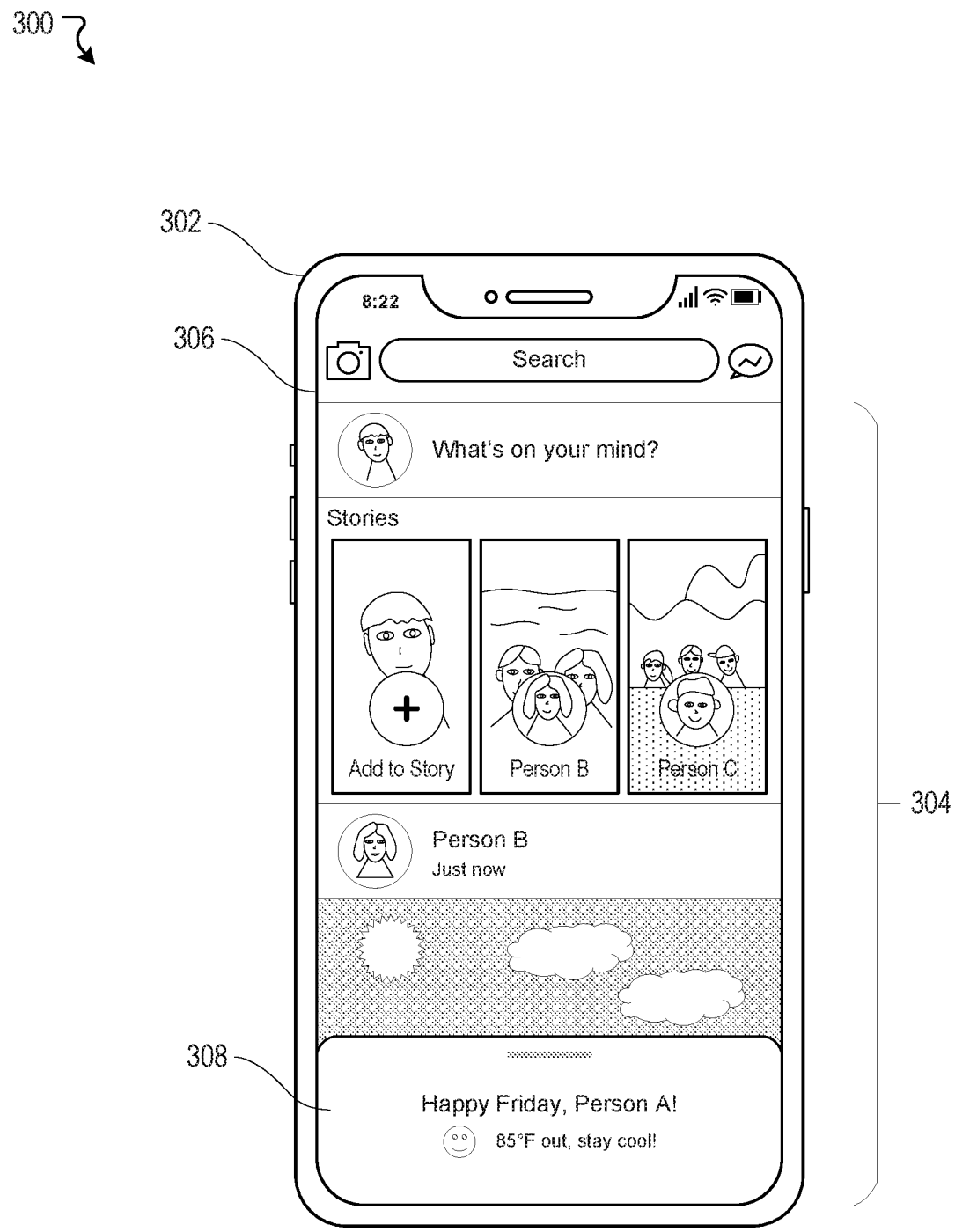
FIG. 3 illustrates an example user interface diagram, according to an embodiment of the present technology.

FIG. 3 illustrates an example user interface diagram 300, according to an embodiment of the present technology. The example diagram 300 relates to a scenario supported by the update module 102 in which a user can access content items through an application (e.g., web browser or mobile application) of a social networking system. In particular, the content items can be accessed through a content feed 304 presented on a display 306 of a computing device 302 (e.g., a smartphone, a tablet, etc.). A notification 308 (e.g., "Happy Friday, Person A!") is provided to the user at a time when the user is most likely to access the social networking system. The notification 308 indicates that an update is available. This update is generated to provide a summary of content items that the user was not able to access during the user's prior absence from the social networking system. In some embodiments, the notification 308 can display location related information (e.g., "85° F. out, stay cool!") based on the user's location. The user can access the update by selecting the notification 308. For example, the user may swipe up, press, or touch the notification 308 to access the update.

Figure 4A:
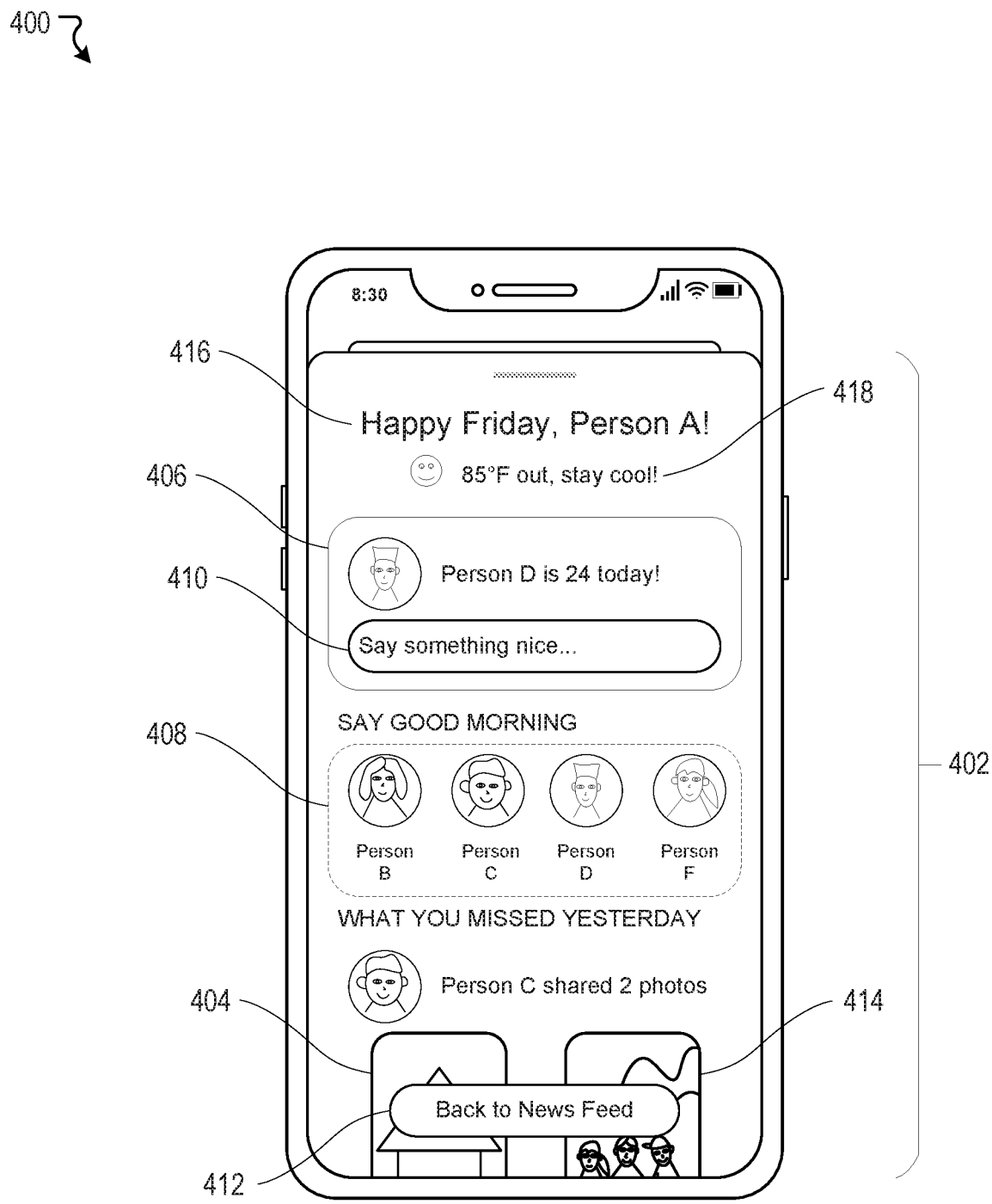
FIG. 4A illustrates another example user interface diagram, according to an embodiment of the present technology.

FIG. 4A illustrates another example user interface diagram 400, according to an embodiment of the present technology. This example diagram 400 relates to a scenario in which a user has selected a notification (e.g., the notification 308 of FIG. 3) presented in a content feed of a social networking system (e.g., the content feed 304 of FIG. 3). In some embodiments, upon user selection of the notification, the user is provided access to an update 402. The update 402 can include various content items and information, including content items that the user has not been able to access in view of the user's previous absence from the social networking system. As shown, the update 402 can display, for example, two content items 404 and 414 posted by another user (e.g., "Person C") of the social networking system that the user has not been able to access since the user last accessed content from the social networking system. In some cases, the update 402 can display a content item 406 relating to a major event of the day (e.g., "Person D is 24 today!"), a greeting 416 (e.g., "Happy Friday, Person A!"), and location related information 418 (e.g., "85° F. out, stay cool!") based on the user's location. In some embodiments, the update 402 can display a list 408 of users who are concurrently accessing content from the social networking system that the user can directly communicate or interact with in real (or near real) time. In such embodiments, the user can select a user in the list 408 to launch a messaging interface or application to communicate with the user. In some embodiments, some content items (e.g., the content item 406) can have a messaging interface 410 through which the user can directly interact with (e.g., comment on, like, etc.) the content items. In some embodiments, the update 402 can include an element 412, that upon user selection, takes the user back to a content feed in which a notification associated with the update 402 first appeared. Many variations are possible.

Figure 4B:
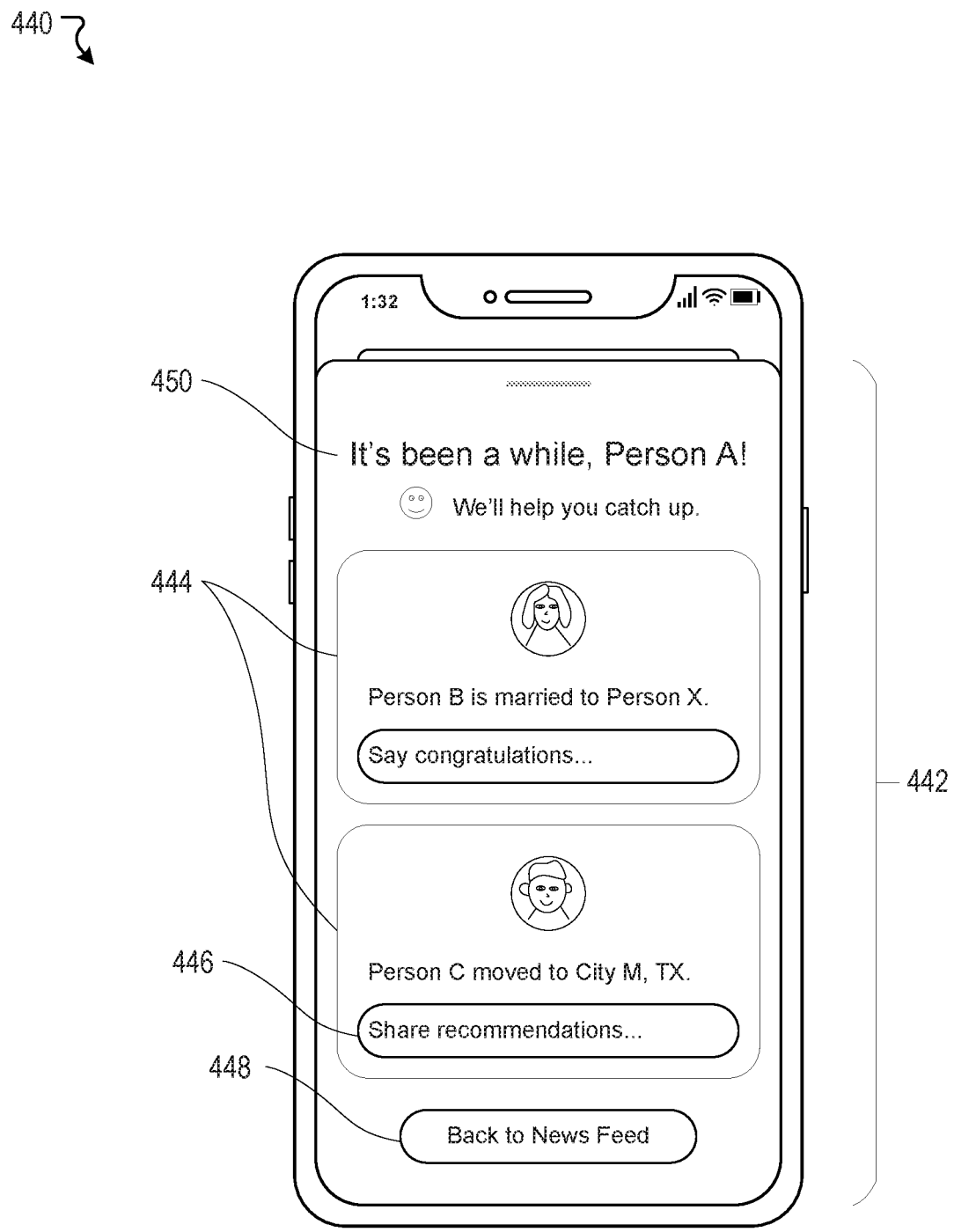
FIG. 4B illustrates yet another example user interface diagram, according to an embodiment of the present technology.

FIG. 4B illustrates yet another example user interface diagram 440, according to an embodiment of the present technology. This example diagram 440 relates to a scenario in which a user has selected a notification (e.g., the notification 308 of FIG. 3) presented in a content feed of a social networking system (e.g., the content feed 304 of FIG. 3). The example diagram 440 relates to a scenario in which the user has not accessed content from the social networking system for a prolonged period of time. In some embodiments, content items relating to life events can be among the most relevant content items to display in an update. Upon user selection of the notification, the user is provided access to an update 442. The update 442 can display a greeting 450 (e.g., "It's been a while, Person A!") and content items 444 relating to life events that the user has not been able to access since the user last accessed content from the social networking system. As shown, a content item associated with a life event can relate to someone getting married (e.g., "Person B is married to Person X") or someone moving to a different city (e.g., "Person C moved to City M, TX"). In some embodiments, one or more of the content items can have a messaging interface 446 through which the user can directly interact with (e.g., comment on, like, etc.) the content items. In some embodiments, the update 442 can include an element 448, that upon user selection, takes the user back to a content feed in which a notification corresponding to the update 442 appeared. Many variations are possible.

Figure 5:
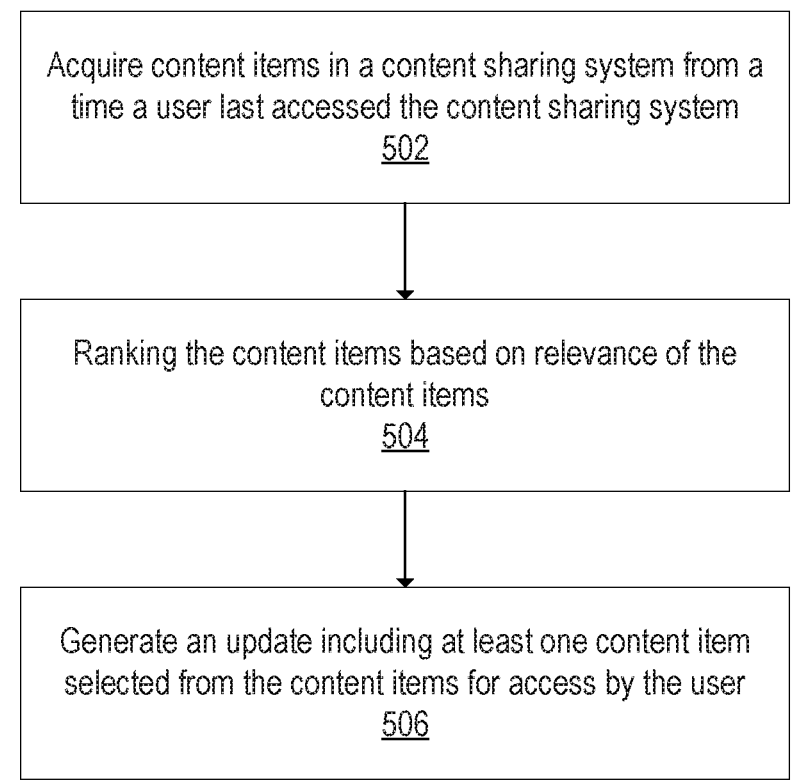
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, content items can be acquired in a content sharing system from a time a user last accessed the content sharing system. At block 504, the content items can be ranked based on relevance of the content items. At block 506, an update including at least one content item selected from the content items for access by the user can be generated.

It is contemplated that there can be many other uses, applications, and/or variations associated with the various embodiments of the present technology. For example, in some cases, user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
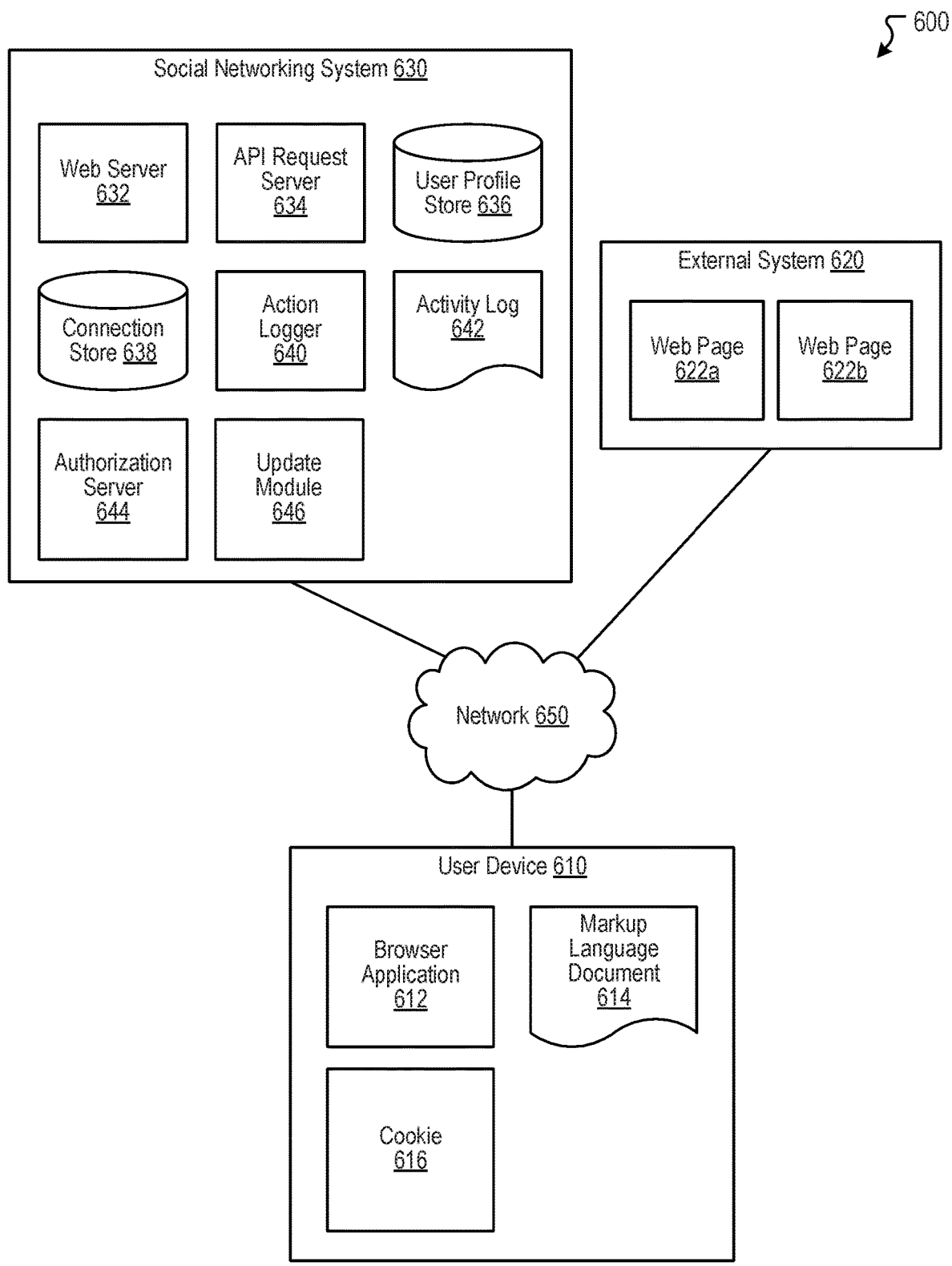
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, media content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and media content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an update module 646. The update module 646 can be implemented with the update module 102 of FIG. 1. In some embodiments, one or more functionalities of the update module 646 can also be implemented in the user device 610.

Hardware Implementation

Figure 7:
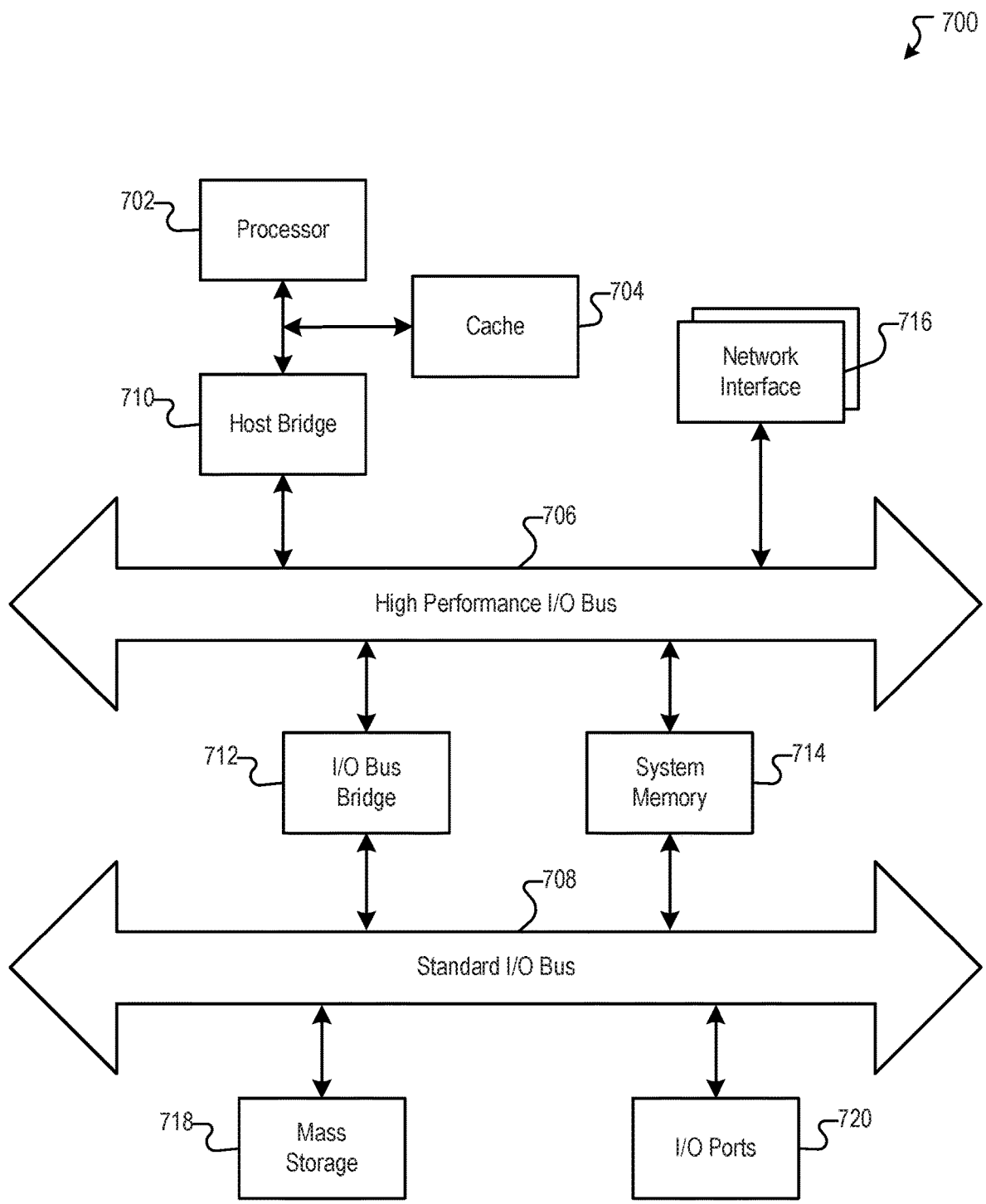
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    acquiring, by a computing system, content items in a content sharing system from a time a user last accessed the content sharing system, wherein the content items were posted by users that are within a threshold level of connection proximity to the user in the content sharing system;
    ranking, by the computing system, the content items based on relevance of the content items;
    generating, by the computing system, an update including a summary of content items selected from the ranked content items; and
    providing, by the computing system, while the user is accessing the content sharing system, a notification for the user through a content feed associated with the content sharing system and separate from the update including the summary of content items, wherein the notification is selectable to access the update including the summary of content items.

2. The computer-implemented method of claim 1, further comprising:
    providing, by the computing system, the update for the user upon user selection of the notification.

3. The computer-implemented method of claim 1, wherein the notification is provided based on a routine of the user and the routine is determined based on a time in a time period within which a probability of the user accessing the content sharing system satisfies a threshold.

4. The computer-implemented method of claim 1, wherein ranking the content items based on the relevance of the content items comprises:
    aggregating the content items from the time the user last accessed the content sharing system to a time the user is currently accessing the content sharing system; and
    determining the relevance of the content items based at least in part on social importance of the content items.

5. The computer-implemented method of claim 4, wherein the social importance of the content items includes a number of comments the content items received in the content sharing system, a number of reactions the content items received in the content sharing system, and a number of shares the content items received in the content sharing system.

6. The computer-implemented method of claim 5, wherein the number of reactions the content items received in the content sharing system includes at least one of likes, loves, or wows.

7. The computer-implemented method of claim 4, wherein the relevance of the content items is determined based on recency of the content items, the recency of the content items determined based on time stamps of the content items.

8. The computer-implemented method of claim 4, wherein the relevance of the content items is determined based on types of content items and the types of content items include at least one of images, video, or text, or content relating to life events.

9. The computer-implemented method of claim 1, wherein the update includes a messaging interface allowing the user to interact with at least one content item.

10. The computer-implemented method of claim 1, wherein the update provides location related information based on location data of the user and the location related information includes at least one of weather information or sports information.

11. A computing system comprising:
    at least one processor; and
    a memory storing instructions that, when executed by the at least one processor, cause the computing system to perform:
        acquiring content items in a content sharing system from a time a user last accessed the content sharing system, wherein the content items were posted by users that are within a threshold level of connection proximity to the user in the content sharing system;
        ranking the content items based on relevance of the content items;
        generating an update including a summary of content items selected from the ranked content items; and
        providing, while the user is accessing the content sharing system, a notification for the user through a content feed associated with the content sharing system and separate from the update including the summary of content items, wherein the notification is selectable to access the update including the summary of content items.

12. The computing system of claim 11, wherein the instructions cause the computing system to further perform:
    providing the update for the user upon user selection of the notification.

13. The computing system of claim 11, wherein the notification is provided based on a routine of the user and the routine is determined based on a time in a time period within which a probability of the user accessing the content sharing system satisfies a threshold.

14. The computing system of claim 11, wherein ranking the content items based on the relevance of the content items comprises:
    aggregating the content items from the time the user last accessed the content sharing system to a time the user is currently accessing the content sharing system; and
    determining the relevance of the content items based at least in part on social importance of the content items.

15. The computing system of claim 14, wherein the relevance of the content items is determined based on recency of the content items, the recency of the content items determined based on time stamps of the content items.

16. A non-transitory computer-readable storage medium including instructions that, when executed by at least one processor of a computing system, cause a computing system to perform a method comprising:
    acquiring content items in a content sharing system from a time a user last accessed the content sharing system, wherein the content items were posted by users that are within a threshold level of connection proximity to the user in the content sharing system;
    ranking the content items based on relevance of the content items;
    generating an update including a summary of content items selected from the ranked content items; and
    providing, while the user is accessing the content sharing system, a notification for the user through a content feed associated with the content sharing system and separate from the update including the summary of content items, wherein the notification is selectable to access the update including the summary of content items.

17. The non-transitory computer-readable storage medium of claim 16, wherein the instructions when executed cause the computing system to further perform:
    providing the update for the user upon user selection of the notification.

18. The non-transitory computer-readable storage medium of claim 16, wherein the notification is provided based on a routine of the user and the routine is determined based on a time in a time period within which a probability of the user accessing the content sharing system satisfies a threshold.

19. The non-transitory computer-readable storage medium of claim 16, wherein ranking the content items based on the relevance of the content items comprises:
    aggregating the content items from the time the user last accessed the content sharing system to a time the user is currently accessing the content sharing system; and
    determining the relevance of the content items based at least in part on social importance of the content items.

20. The computer-implemented method of claim 1, wherein the update further includes an element selectable to access the content feed.

* * * * *